United States Patent
Zank et al.

(10) Patent No.: US 6,252,030 B1
(45) Date of Patent: Jun. 26, 2001

(54) HYDROGENATED OCTASILSESQUIOXANE-VINYL GROUP-CONTAINING COPOLYMER AND METHOD FOR MANUFACTURE

(75) Inventors: Gregg Alan Zank, Tokyo; Michitaka Suto, Kanagawa, both of (JP)

(73) Assignee: Dow Corning Asia, Ltd., Tokyo (JP)

( * ) Notice: Subject to any disclaimer, the term of this patent is extended or adjusted under 35 U.S.C. 154(b) by 0 days.

(21) Appl. No.: 09/521,558

(22) Filed: Mar. 9, 2000

(30) Foreign Application Priority Data

Mar. 17, 1999 (JP) .................................................. 11-072304
Mar. 17, 1999 (JP) .................................................. 11-072307

(51) Int. Cl.[7] ........................ C08G 77/12; C08G 77/20; C08G 77/04
(52) U.S. Cl. ................................ 528/31; 528/25; 528/15; 528/32; 528/33; 525/478; 525/479; 556/450; 556/451; 556/455; 556/460; 556/466; 556/479
(58) Field of Search .................................. 528/15, 25, 31, 528/32, 33; 525/478, 479; 556/450, 451, 455, 460, 466, 479

(56) References Cited

U.S. PATENT DOCUMENTS

| | | | |
|---|---|---|---|
| 5,412,053 | 5/1995 | Lichtenhan et al. | 528/9 |
| 5,484,867 | 1/1996 | Lichtenhan et al. | 528/9 |
| 5,589,562 | 12/1996 | Lichtenhan et al. | 528/9 |
| 5,663,245 | * 9/1997 | Kennedy et al. | 525/479 |
| 5,837,364 | * 11/1998 | Zank | 428/312.6 |
| 6,143,360 | * 11/2000 | Zhong | 427/244 |

OTHER PUBLICATIONS

J. D. Lichtenhan et al., Chem. Mater., 1996, 8, 1250–1259.
J. D. Lichtenhan et al., Comments Inorg. Chem., 1995, 17, 115–130.
J. D. Lichtenhan et al., Macromolecules, 1993, 26, 2141–2142.
Sellinger et al., Macromolecules, 1996, 29, 2327–2330.
Hoebbel et al., J. Non–Crystalline Solids, 176 (1994), 179–188.
I. Hasegawa, J. of Sol–Gel Sci. and Technol., 1995, 5(2), 93–100.

* cited by examiner

Primary Examiner—Robert Dawson
Assistant Examiner—Jeffrey B. Robertson
(74) Attorney, Agent, or Firm—William F. Boley; Rick D. Streu

(57) ABSTRACT

A method for manufacturing an organic solvent-soluble hydrogenated octasilsesquioxane-vinyl group-containing compound copolymer comprising reacting 1 mol of (A) a hydrogenated octasilsesquioxane described by formula I Formula 1

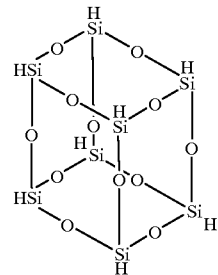

with 0.2 to less than 3 mol of (B) a divinyl group-containing compound described by formula (2)

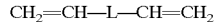

$CH_2=CH-L-CH=CH_2$  Formula 2 where L is selected from the group consisting of
(a) a divalent hydrocarbon group comprising 3 to 10 carbon atoms and
(b) $-(SiR_2O)_m-SiR_2-$, where each R is independently selected from the group consisting of alkyls comprising 1 to 6 carbon atoms and aryls comprising 6 to 9 carbon atoms and $1 \leq m \leq 10$; in the presence of a hydrosilylation catalyst.

11 Claims, No Drawings

HYDROGENATED OCTASILSESQUIOXANE-VINYL GROUP-CONTAINING COPOLYMER AND METHOD FOR MANUFACTURE

BACKGROUND OF INVENTION

The present invention relates to a an organic solvent-soluble organopolysiloxane having a cage structure, and more particularly to an octasilsesquioxane-containing copolymer to its method of manufacture.

Because of their excellent heat resistance, electrical insulation, flame resistance, weatherproofness, and so forth, organopolysiloxanes have been utilized in the past as resist materials for semiconductors, insulator materials for motors, impregnated insulator materials for transformers, paints, primers, and so on (see "Silicone Handbook," edited by Kunio Ito, published in 1990 by Nikkan Kogyo Shinbunsha). Many different compositions and structures are known for organopolysiloxanes, and there is also a wide variety to their properties.

Still, there is a need for further improvements in the characteristics of these electrical and electronic materials. Examples of these characteristics include insulation, heat resistance, and durability.

The following art is known in regard to methods for manufacturing a copolymer in which a silsesquioxane is one of the copolymerization components.

Lichtenhan et al. have disclosed a method for manufacturing a copolymer in which a polyhedral oligomeric silsesquioxane is crosslinked (bonded) with a difunctional silane, siloxane, or organometal compound having a functional group such as an amine (J. D. Lichtenhan et al., U.S. Pat. No. 5,412,053; J. D. Lichtenhan et al., U.S. Pat. No. 5,589,562; and J. D. Lichtenhan et al., Chem. Mater., 1996, 8, 1250–1259). All of these disclose a method for manufacturing a copolymer in which a so-called incomplete cage structure where there is a defect in the cage of a silsesquioxane (a structure that is not a perfect octahedron, with part thereof missing) is bonded with a siloxane.

J. D. Lichtenhan et al. (Comments Inorg. Chem., 1995, 17, 115–130) have also disclosed a method for manufacturing a copolymer whose main chain is a silsesquioxane with an incomplete cage structure bonded with a siloxane or the like, and a method for manufacturing a copolymer in which a silsesquioxane with a cage structure is used as a pendant copolymerization component, and methacrylic acid is used as the copolymer main chain component.

Furthermore, J. D. Lichtenhan et al. (Macromolecules, 1993, 26, 2141–2142) have disclosed a method for manufacturing a silsesquioxane-siloxane copolymer by reacting bis(dimethylamino)silanes or the like with the OH groups bonded to the silicon atoms located in the corners of the incomplete cage structure of a silsesquioxane.

Methods for manufacturing a copolymer by reacting a silsesquioxane having an incomplete cage structure with another compound have been disclosed in J. D. Lichtenhan et al. U.S. Pat. No. 5,484,867 and by Sellinger et al. in Macromolecules, 1996, 29, pp. 2327–2330.

U.S. Pat. No. 5,484,867 discloses a method for manufacturing a graft copolymer having a pendent silsesquioxane in which a vinyl group-containing compound is bonded in the corner of a silsesquioxane with an incomplete cage structure, and this compound is graft polymerized to another copolymer via the above-mentioned vinyl group, as well as a method for manufacturing a silsesquioxane-added ABA-type block copolymer obtained by the reaction of the vinyl groups of the above-mentioned vinyl group-containing silsesquioxane compound and a copolymer having vinyl groups at both ends. There is general mention that variable factors such as substituents affect the thermal characteristics, solubility, and so forth of the copolymer that is obtained.

The above-mentioned article by Sellinger et al., Macromolecules, 1996, 29, pp. 2327–2330, discusses a method for manufacturing a cage-type silsesquioxane in which methacrylate groups have been introduced at a plurality of the cage corners by subjecting propargyl methacrylate and a cage structure silsesquioxane to hydrosilylation, and it is stated that the product obtained by this method is soluble in organic solvents.

Nevertheless, the above-mentioned publications do not discuss a method for manufacturing a soluble copolymer consisting of one or more linked hydrogenated octasilsesquioxanes by reacting and bonding the hydrogen of hydrogenated octasilsesquioxane with at least one of the vinyl groups of a compound having vinyl groups at both ends through hydrosilylation.

Hoebbel et al. (J. Non-Crystalline Solids, 176 (1994), 179–188)) have disclosed a method for manufacturing a complete cage-type silsesquioxane compound in which vinyl groups are bonded at a plurality of the cage corners via Si—O— bonds, and have reported that the copolymer obtained from this compound is a transparent gel (that is, the copolymer thus obtained is insoluble).

Furthermore, 1. Hasegawa (J. of Sol-Gel Sci. and Technol. (1995), 5 (2), 93–100) has disclosed a method for manufacturing a compound in which the cage structure of silsesquioxane is not destroyed, and is merely bonded with dimethylsilyl groups.

None of the cited literature has disclosed a method for manufacturing a copolymer that is soluble in organic solvents and has hydrogenated octasilsesquioxane on its main chain by reacting a hydrogenated octasilsesquioxane having a cage structure (that is, hydrogenated octasilsesquioxane) and a compound having vinyl groups at both ends by a hydrosilylation reaction.

There has been a need for a copolymer that has excellent electrical insulation properties and whose heat resistance, weatherproofness, oxidation resistance, and so forth are superior to those obtained with the above-mentioned prior art. It is an object of the present invention to provide a method for manufacturing a material that meets the above need, namely, an organic solvent-soluble copolymer (hereinafter referred to as the "present copolymer", in which hydrogenated octasilsesquioxane and a compound having vinyl groups at both ends are allowed to react by hydrosilylation. Here, the compound having vinyl groups at both ends is one of the monomer components that constitute the copolymer, but in the sense that it has an action of bonding the hydrogenated octasilsesquioxane, it can also be called a crosslinking agent.

SUMMARY OF INVENTION

The present invention is an organic solvent-soluble hydrogenated octasilsesquioxane-vinyl group-containing copolymer and its method of manufacture. The method comprises reacting 1 mol of (A) a hydrogenated octasilsesquioxane described by formula 1

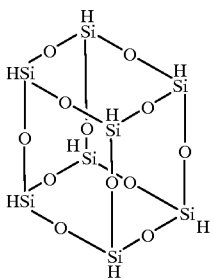

Formula 1 with 0.2 to less than 3 mol of (B) a divinyl group-containing compound described by formula (2)

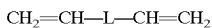

Formula 2 where L is selected from the group consisting of
(a) a divalent hydrocarbon group comprising 3 to 10 carbon atoms and
(b) $—(SiR_2O)_m—SiR_2—$, where each R is independently selected from the group consisting of alkyls comprising 1 to 6 carbon atoms and aryls comprising 6 to 9 carbon atoms and $1 \leq m \leq 10$; in the presence of a hydrosilylation catalyst.

DESCRIPTION OF INVENTION

The present invention is an organic solvent-soluble hydrogenated octasilsesquioxane-vinyl group-containing copolymer and its method of manufacture. The method comprises reacting 1 mol of (A) a hydrogenated octasilsesquioxane described by formula 1

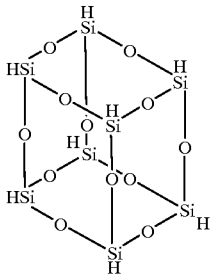

Formula 1 with 0.2 to less than 3 mol of (B) a divinyl group-containing compound described by formula (2)

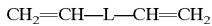

Formula 2 where L is selected from the group consisting of
(a) a divalent hydrocarbon group comprising 3 to 10 carbon atoms and
(b) $—(SiR_2O)_m—SiR_2—$, where each R is independently selected from the group consisting of alkyls comprising 1 to 6 carbon atoms and aryls comprising 6 to 9 carbon atoms and $1 \leq m \leq 10$; in the presence of a hydrosilylation catalyst.

As shown in Formula 1, the hydrogenated octasilsesquioxane (A) has a cage structure in which hydrogen atoms are bonded to the silicon atoms that constitute the corners of the cage. The present invention provides a method by which the structural advantages of both components can be taken advantage of by using the above-mentioned divinyl compound (B) as a bond portion with the above-mentioned hydrogenated octasilsesquioxanes (A) (alternating block copolymer component).

The present hydrogenated octasilsesquioxane-vinyl group-containing copolymer (hereinafter in the alternative referred to as "present copolymer") combines the characteristics originating in the hydrogenated octasilsesquioxane (A) (such as its strength and electrical characteristics) with the flexibility originating in the divinyl compound (B). Accordingly, this copolymer will exhibit excellent insulation characteristics, heat resistance, strength, and so forth when used in applications such as impregnation materials, interlayer materials, cover films, and molding materials.

The hydrogenated octasilsesquioxane-vinyl group-containing copolymer obtained by the method of the present invention is believed to be such that the SiH functionality at the corners of the cage structure form siloxane bonds with the SiH functionality of other cage structure corners when the copolymer is heated, allowed to stand, or otherwise handled after being applied to the required area in a mode of coating, packing, molding, or the like. As a result, the copolymer obtained with the present invention can be used to construct a three-dimensionally reticulated structure, creating a cover film, layer, molded article, or interlayer insulation material with excellent mechanical properties and improved stability, heat resistance, oxidation resistance, and insulation characteristics.

The present copolymer is obtained by reacting the hydrogenated octasilsesquioxane compound (A) with the divinyl compound (B) in the proportions specified in the manufacturing method of the present invention. Here, softness and flexibility are introduced into the above-mentioned copolymer and the above-mentioned characteristics are synergistically improved by the use of divinyl group-containing compound (B). The flexibility introduced into this copolymer makes it easier to apply an insulation coating, for instance, forming a coating film that is free of defects and creating toughness in the resulting film.

Octasilsesquioxane generally has high crystallinity, and the same holds true for hydrogenated octasilsesquioxane, so it is not easy to obtain a good cover film with hydrogenated octasilsesquioxane alone.

The present hydrogenated octasilsesquioxane-vinyl group-containing compound copolymer is amorphous, and furthermore is soluble in organic solvents, so the excellent characteristics had by hydrogenated octasilsesquioxane (such as its mechanical properties, electrical characteristics, and curability) can be put to use in many applications, including insulation materials.

After being applied to a substrate, the present copolymer is cured when the SiH functionalities contained in the octasilsesquioxane structures of this copolymer form siloxane bonds with the residual SiH functionalities of other octasilsesquioxanes. Depending on the atmosphere and conditions, this curing reaction may produce hydrogen gas as a by-product.

For instance when prior art materials are used as an insulation material, after they have been applied over an electronic substrate or a silicon wafer, by-products may result from reactions between unreacted functional groups under harsh conditions such as high temperature. In the case of the present copolymer, even if there is a by-product, the fact that it is hydrogen gas is clearly advantageous in terms of maintaining the electrical characteristics or mechanical properties of the insulation material or affecting the object to which it is applied, as compared to an insulation material that gives off by-product substances including carbon atoms or chlorine atoms.

The substitutent L of divinyl group-containing compound (B) described by Formula 2 ($CH_2=CH-L-CH=CH_2$) is selected from the group consisting of (a) a divalent hydrocarbon group comprising 3 to 10 carbon atoms and (b) —$(SiR_2O)_m$—$SiR_2$—, where each R is independently selected from the group consisting of alkyls comprising 1 to 6 carbon atoms and aryls comprising 6 to 9 carbon atoms and $1 \leq m \leq 10$.

If the hydrocarbon group (a) has less than 3 carbon atoms, the monomer component will be prone to volatilization and the material will be more difficult to handle, and furthermore the improvement to the properties will be inadequate for such reasons as the poor flexibility of the obtained copolymer. If the hydrocarbon group (a) has over 10 carbon atoms, however, there will be a relatively small proportion of cage structure hydrogenated octasilsesquioxane in the copolymer, and the various characteristics had by the present copolymer will not be fully realized. As long as it reacts with the SiH functionality at the cage structure corners of the hydrogenated octasilsesquioxane so that the present copolymer exhibits the desired effect, the above-mentioned hydrocarbon groups (a) may be either linear or branched aliphatic hydrocarbon groups or aromatic hydrocarbon groups, and some of the substituents may be hetero atoms other than carbon or hydrogen atoms, such as fluorine, silicon, or oxygen. It is preferable to select an aromatic hydrocarbon group as the above-mentioned hydrocarbon group because heat resistance will be enhanced. When the reaction of the SiH functionality at the corners of the cage structure is taken into account, it is preferable for the above-mentioned aliphatic hydrocarbon groups to be saturated.

As to the repeating units of the above-mentioned siloxane (b), m is set to be at least 1 and no greater than 10 and R is as described above. When an aryl group is selected for R, heat resistance is better than it would be otherwise.

Specific examples of L within the scope of the above-mentioned (b) include —$R^3R^4Si$—O—$SiR^3R^4$— and —$R^3R^4SiO)_m$—$SiR^3R^4$, where $R^3$ and $R^4$ are each independently selected $C_1$ to $C_6$ linear or branched alkyl groups or a $C_6$ to $C_9$ aryl group, and m is a number from 2 to 10.

The following are specific examples of divinyl group-containing compound (B) described by the above Formula 2. Specific examples when L in General Formula 2 is selected from among the above-mentioned (a) include $CH_2=CH-(CH_2)_3-CH=CH_2$, $CH_2=CH-(CH_2)_4-CH=CH_2$, $CH_2=CH-(CH_2)_5-CH=CH_2$, $CH_2=CH-(CH_2)_6-CH=CH_2$, $CH_2=CH-(CH_2)_7-CH=CH_2$, $CH_2=CH-(CH_2)_8-CH=CH_2$, $CH_2=CH-(CH_2)_9-CH=CH_2$, $CH_2=CH-(CH_2)_{10}-CH=CH_2$, $CH_2=CH-Ar-CH=CH_2$ (i.e. 1,4-divinylbenzene), $CH_2=CH-ArF_4-CH=CH_2$ (i.e. 1,4-divinyl-2,3,5,6-tetrafluorobenzene), and $CH_2=CH-CH_2-C(CH_3)_2-CH_2-CH=CH_2$, wherein the above formulas, Ar is a phenylene group, and $ArF_4$ is a tetrafluorophenylene group.

Specific examples when L is selected from among the above-mentioned (b) include $CH_2=CH-Si(CH_3)_2OSi(CH_3)_2-CH=CH_2$, $CH_2=CH-Si(CH_3)_2O)_xSi(CH_3)_2-CH=CH_2$, and $CH_2=CH-Si(Ph)_2OSi(Ph)_2-CH=CH_2$, where in the above formulas, x is 2 to 10, and Ph is a phenyl group.

The divinyl group-containing compound (B) must be reacted in an amount of at least 0.2 mol but less than 3 mol per mole of the hydrogenated octasilsesquioxane (A). If the divinyl group-containing compound (B) accounts for more than 3 mol, the resulting copolymer will be in the form of a gel and its solubility in organic solvents will be lost. The reason for this is believed to be that if an excess amount of divinyl group-containing compound (B) is used, more of it than necessary will be added at the corners of the cage structure hydrogenated octasilsesquioxane, so more cage structure than necessary will be formed. On the other hand, at less than 0.2 mol. a crosslinked structure will not be formed to the required extent necessary for good, heat resistance, electrical insulation, flame resistance, weatherproofness, and mechanical properties such as strength and toughness and the finished product will not have the required combination of these properties for an insulation material.

In order to facilitate a better understanding of the present invention, working and comparative examples of this invention will be given, including manufacturing examples of the hydrogenated octasilsesquioxane that serves as a raw material in the manufacturing method of the present invention. This does not mean, however, that the present invention is limited to just these embodiments.

Method for manufacturing hydrogenated octasilsesquioxane

In the process of manufacturing a solid polymer resin according to the method outlined in Working Example 1 of Japanese Patent Publication S43-31838, the benzene phase was washed until neutral, after which the benzene solution was filtered, and the insoluble substance thus obtained was collected and washed with hexane. The substance that was insoluble in the hexane was analyzed by the following methods.

GPC was conducted with a Tosoh chromatograph equipped with a $TSK_{gel}$ $G2000H_{HR}$ column using toluene as the mobile phase. The $^1H$ and $^{29}Si$ NMR spectra were recorded with a Bruker 300 mHz spectrometer. X-ray diffraction analysis was conducted with a JEOL JDX-3530 diffractometer by means of CuKa radiation and a graphite monochrometer. GC mass analysis was conducted with a Shimadzu GC-MSQP1000EX chromatograph using a DB-5 column. The best separation occurred when the temperature was raised from an initial temperature of 80° C. to 300° C at a rate of 40° C./min and held there for 30 minutes.

The results of this analysis were as follows.
Identification Data
MS: (M-H)←; m/z=423 d
IR (Nujolmull, KBr plates): 2290 (s), 1140 (vs), 918 (w), 885 (sh), 870 (s), $^{29}Si$ NMR ($C_6 D_6$, $(CH_3)_4Si=0$, $Cr(acac)_3$ 0.026 M): δ=-84.452 (s).
MS: mass spectrum
IR: infrared absorption spectrum The above analysis results confirm that the substance that was obtained by the above-mentioned manufacturing method that was insoluble in hexane was hydrogenated octasilsesquioxane ($^HT_8$).

Synthesis of hydrogenated octasilsesquioxane-containing copolymer

The reaction between the hydrogenated octasilsesquioxane compound (A) and the divinyl group-containing compound (B) can be conducted in an organic solvent such as toluene, using any hydrosilylation catalyst used in ordinary hydrosilylation or for adduct-type silicone rubbers and the like as the reaction catalyst. The hydrogenated octasilsesquioxane used here was manufactured by the above method, but a commercially available product can also be used.

Specific examples of the above-mentioned catalyst include platinum chloride, chloroplatinic acid, a platinum-olefin complex, a platinum-phosphine complex, a platinum-vinylsiloxane complex, and solutions of these.

There are no particular restrictions on the amount in which the catalyst is used, as long as it is the amount required for the reaction, but it is preferable for the amount to be such that there is a molar ratio of platinum of 1/100,000 to 1/100 per mole of the vinyl groups in Formula 2.

Toluene is usually used as the organic solvent. The reaction temperature is selected from a range of room temperature to below the boiling point of the organic solvent. The reaction is generally conducted at normal pressure.

The repeating units of the present copolymer are described by the following formula, for example.
(Chemical Formula 3)

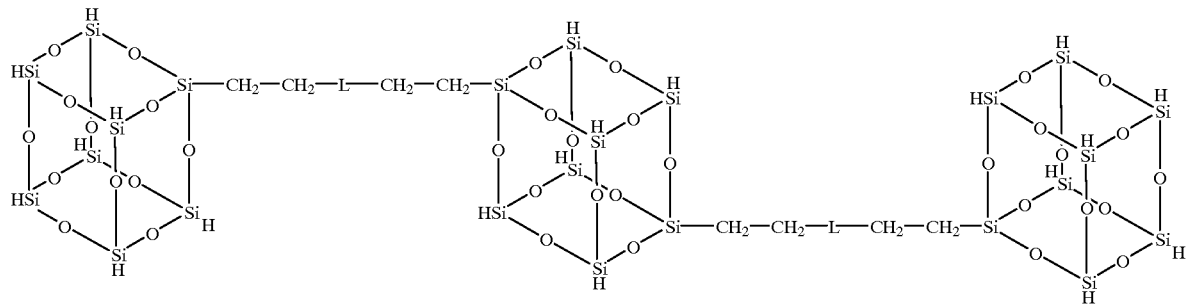

The copolymer described by the above formula exhibits a structure in which vinyl groups have undergone β-addition, and it is clear that the copolymer obtained from the reaction may in some cases be a copolymer including a structure in which there are β-added vinyl groups.

The above formula is an example of a typical copolymer having a linear structure, in which the vinyl groups have reacted with the hydrogens at diagonally opposed locations. In a copolymer that is actually manufactured, it is believed that there will also be some molecules in which vinyl groups have reacted with three or more of the hydrogens of the hydrogenated octasilsesquioxane. The use of divinyl group-containing compound (B) as above facilitates the bonding of the hydrogenated octasilsesquioxane (A), allowing the above-mentioned copolymer to be manufactured more efficiently. Also, compared to a copolymer reaction that forms siloxane bonds by condensation, the amount of reaction product is smaller, and there are fewer adverse effects on the cover film or other finished product resulting in fewer defects and a finished product is obtained with excellent toughness and other aspects of mechanical strength, as well as insulation properties and other electrical characteristics.

Furthermore, the present copolymer can be made insoluble or harder or softer by varying the reaction components (such as the length of the molecular chain of compound (B) and the constituent atoms), the reaction conditions, and so forth. In more specific terms, if a component with a long chain is used as the linking component (crosslinking component), a relatively soft final copolymer can generally be obtained. With linking components of a given carbon number, one with a branched structure will yield a harder copolymer than one that is linear. Also, in general, a copolymer with a correspondingly higher viscosity is obtained as the amount of crosslinking component increases.

The most important thing in the manufacturing method of the present invention is to obtain a copolymer that is amorphous and soluble in organic solvents. This is accomplished by setting the molar ratio of the hydrogenated octasilsesquioxane (A) and divinyl group-containing compound (B) as above, so that compound (B) is added to the method in at least 0.2 mol but less than 3 mol per mole of hydrogenated octasilsesquioxane.

In addition to solubility in organic solvents, good viscosity and flexibility can be ensured in the present copolymer by the divinyl compound (B), so the electrical insulation and weatherproofness that are characteristics of the hydrogenated octasilsesquioxane can be fully realized. As a result, the present copolymer can be utilized in a wide range of applications, including materials for forming an insulating cover film, weatherproof paint materials, and laminate binders (interlayer insulation).

Another feature of the manufacturing method of the present invention is that the viscosity, flexibility, and so forth of the copolymer can be adjusted to suit the intended state of the material or to suit the application method, such as coating, by suitable selection of divinyl group-containing compound (B) that serves as a copolymerization component the bonding component (crosslinking component).

Also, if needed, there is no problem with blending other copolymers into the present copolymer so long as the required properties are not compromised. It is also possible to add antioxidants, colorants, fillers, and the like that are normally used in insulating films, weatherproof films, the binder layer of laminates, impregnated insulation materials, and so forth.

The present copolymer usually contains no monomer components because the reaction components have reacted completely, and therefore has good storage stability, allowing it to be used as is. Monomers can also be removed in the event that the reaction is incomplete.

A manufacturing method will now be described in detail for a case in which divinyltetramethyldisiloxane ((ViMe$_2$Si)$_2$ O) is used as a crosslinking component.

13.5 g (0.032 mol) Of hydrogenated octasilsesquioxane and 5.95 g (0.032 mol) of divinyltetramethyldisiloxane ((ViMe$_2$Si)$_2$O) dissolved in 700 mL of toluene distilled from sodium under a nitrogen atmosphere were put into a 1 L three-necked flask purged with nitrogen and equipped with a magnetic stirrer and an air-cooled compressor. 0.05 g Of a toluene solution (containing 200 ppm platinum by weight) of a zero-valent platinum complex of divinyltetramethyldisiloxane was added under agitation to the above system. The system was allowed to react while maintained at 60° C. for 20 hours after this addition, and was then cooled, filtered, and dried by a rotary evaporator. The system was further dried at ambient temperature under vacuum. 75 mL Of hexane was used to separate the polymer from the small amount of excess hydrogenated octasilsesquioxane that remained. The slightly dissolved hydrogenated silsesquioxane (1.7 g) was filtered off. Hexane was removed from the filtrate under a vacuum, and the solid copolymer was dried for 3 hours at 40° C. under a vacuum. The yield was 16.26 g, which was 91.3% of the theoretical value.

The present invention will now be described in detail through working examples. These examples are utilized to give a better understanding of the present invention, and the present invention is not limited by their content.

WORKING EXAMPLE 1

2.12 g (0.005 mol) Of hydrogenated octasilsesquioxane was dissolved in 100 mL of toluene in a 200 mL flask. 0.97 g (0.005 mol) Of divinyltetramethyldisiloxane was added to this solution, and 0.05 g of a toluene solution (containing 200 ppm platinum by weight) of zero-valent platinum complexed with divinyltetramethyldisiloxane was added. After this, the mixture was heated to 55° C. while being mixed under an argon gas flow, and the temperature was held at 55° C. for 20 hours. Upon completion of the reaction, the product was cooled to room temperature, and the organic solvent was distilled off under reduced pressure. The resulting copolymer was soluble in toluene, chloroform, and methyl isobutyl ketone. The characteristics of this copolymer were as follows.

$^{29}$Si-NMR: d 8.44, d (-a and b-ethylene-Me$_2$SiO-) d 65.60 (ethylene-SiO$_{3/2}$—) d-84.61 (HSiO$_{3/2}$—). This compound was basically a copolymer in which hydrogenated octasilsesquioxane was bonded with a divinyl compound, and was soluble in organic solvents.

WORKING EXAMPLES 2 TO 9 AND COMPARATIVE EXAMPLE 1

Working Examples 2 to 9 and Comparative Example 1 were conducted, with the blend ratio of the divinyl group-containing compound (B) to the hydrogenated octasilsesquioxane (A) and the type of compound (B) varied as shown in Table 1, and with the other conditions the same as in Working Example 1.

WORKING EXAMPLE 10

1.5 g (0.035 mol) Of hydrogenated octasilsesquioxane was dissolved in 100 mL of toluene in a 200 mL flask. 0.455 g (0.0035 mol) Of divinylbenzene and 0.05 g of a toluene solution (containing 200 ppm platinum by weight) of zero-valent platinum complexed with divinyltetramethyldisiloxane were added to this solution. After this, the solution was heated to 60° C. while being agitated under an argon gas flow, and the temperature was held constant for 20 hours. Upon completion of the reaction, the solution was cooled to room temperature, and the organic solvent was distilled off under reduced pressure. A polysiloxane was obtained in the form of a waxy, white solid. This copolymer was soluble in toluene, chloroform, and methyl isobutyl ketone. The characteristics of this copolymer were as follows. $^{29}$Si-NMR: d 8.44, d (-a and b-ethylene-Me$_2$SiO-) d 65.60 (ethylene-SiO$_{3/2}$—) d-84.61 (HSiO$_{3/2}$—)

WORKING EXAMPLE 11

The blend ratio of the divinyl group-containing compound (B) to the hydrogenated octasilsesquioxane (A) and the type of divinyl group containing compound (B) were varied as shown in Table 1, and the other conditions are the same as in Working Example 10.

COMPARATIVE EXAMPLE 2

A solution of 12.7 g of trichlorosilane (HSiCl$_3$) in 150 mL of toluene was slowly added to a vigorously agitated mixture composed of 200 mL toluene, 80.3 g sulfuric acid (95 to 98% H$_2$SO$_4$), and 60.4 g filming sulfuric acid (15% SO$_3$). The addition of the silane to the acid medium was performed over a period of 6.5 hours. Upon completion of this addition, the reaction mixture was poured into a separating funnel and the acid phase removed. The toluene phase was washed until neutral, after which the toluene solution was filtered to obtain 0.1 g of insoluble substance. The toluene solution was evaporated yielding 4.9 g (97.8% yield) of solid resin polymer (HSiO$_{3/2}$)$_n$. This resin is termed "conventional resin composed of hydrogenated silsesquioxane" in Table 2.

COMPARATIVE EXAMPLE 3

8.5 g (0.020 mol calculated as hydrogenated octasilsesquioxane) Of a solid resin polymer that was completely soluble in hexane and was obtained according to the method described in Working Example 1 of Japanese Patent Publication S43-3 1838 was dissolved in 400 mL of toluene under an argon atmosphere. 0.05 g Of a toluene solution (containing 200 ppm platinum by weight) of zero-valent platinum complexed with divinyltetramethyldisiloxane and 4.0 g (0.021 mol) of divinyltetramethyldisiloxane ((Me$_2$ViSi)$_2$O) were added to the above solution and mixed for 64 hours at 60° C. This solution was then filtered and the residue subjected to reduced pressure at room temperature, which gave a solid in the form of a gel. This gel was insoluble in toluene and in hexane.

In Table 1 are compiled the forms of the copolymers obtained by the manufacturing methods of the above-mentioned Working Examples 1 to 11 and Comparative Example 1, in which hydrogenated octasilsesquioxane ($^H$T$_8$) and various divinyl group-containing compounds were used as raw materials.

TABLE 1

Forms of copolymers obtained by varying the molar ratios of hydrogenated octasilsesquioxane (A) ($^H$T$_8$) and various divinyl group-containing compounds (B)

| Example No. | (Top row) Type (structure) of divinyl compound (B) (Bottom row) Molar ratio of divinyl compound (B) to $^H$T$_8$ (calculated for 1 mol $^H$T$_8$) | Form of product | Number average molecular weight | Weight average molecular weight | Tg (° C.) | Yield (%) | Wt. loss at 450° C. (%) |
|---|---|---|---|---|---|---|---|
| W. E. 1 | ViMe$_2$SiOSiMe$_2$Vi 1.0 | soluble solid | 3090 | 60100 | 30 | 91.3 | 11 |

TABLE 1-continued

Forms of copolymers obtained by varying the molar ratios of hydrogenated octasilsesquioxane (A) ($^H T_8$) and various divinyl group-containing compounds (B)

| Example No. | (Top row) Type (structure) of divinyl compound (B) (Bottom row) Molar ratio of divinyl compound (B) to $^H T_8$ (calculated for 1 mol $^H T_8$) | Form of product | Number average molecular weight | Weight average molecular weight | Tg (° C.) | Yield (%) | Wt. loss at 450° C. (%) |
|---|---|---|---|---|---|---|---|
| W. E. 2 | ViMe$_2$SiOSiMe$_2$Vi 0.25 | soluble solid | ≈1000 | ≈1300 | | | |
| W. E. 3 | ViMe$_2$SiOSiMe$_2$Vi 1.5 | soluble solid | 3610 | 93400 | 70 | 86.4 | |
| W. E. 4 | ViMe$_2$SiOSiMe$_2$Vi 2.0 | soluble solid | 6360 | 331400 | 115 | 96.2 | 4 |
| W. E. 5 | ViPh$_2$SiOSiPh$_2$Vi 2.0 | soluble solid | 1020 | 1360 | | | |
| W. E. 6 | ViPh$_2$SiOSiPh$_2$Vi 0.5 | soluble solid | 1310 | 12600 | | | |
| W. E. 7 | ViPh$_2$SiOSiPh$_2$Vi 1.0 | soluble solid | 2400 | 108600 | | 93.5 | |
| W. E. 8 | Vi(Me$_2$SiO)$_5$SiMe$_2$Vi 1.0 | soluble liquid | 4410 | 8230 | 60 | 84.2 | |
| W. E. 9 | Vi(Me$_2$SiO)$_6$SiMe$_2$Vi 1.0 | soluble liquid | 3250 | 7790 | 70 | 92.4 | |
| W. E. 10 | ViC$_6$H$_4$Vi 1.0 | soluble solid | 9670 | 17540 | | 96.4 | |
| W. E. 11 | ViC$_6$H$_4$Vi 2.0 | soluble solid | 9980 | 284000 | | | |
| C. E. 1 | ViMe$_2$SiOSiMe$_2$Vi 3.0 | gel | — | — | | | |

(W. E.: Working Example; C. E.: Comparative Example)
$^H T_8$ = hydrogenated octasilsesquioxane, Vi = vinyl group, Me = methyl group, Ph = phenyl group
Blank spaces in the columns for Tg, Yield, and Weight loss at 450° C. indicate that no measurement was made.

The manufacturing method of the present invention allows the desired copolymer to be manufactured by reacting at least 0.2 mol but less than 3 mol of a divinyl group-containing compound (B) per mole of hydrogenated octasilsesquioxane (A), but as is clear from the results given in Table 1, within this range there is a sub-range of at least 0.25 mol but less than 2 mol that is suited to obtaining an organic solvent-soluble copolymer.

Dielectric constants of various polysiloxane polymers and films formed from them The present copolymers obtained in Working Examples 1 and 10 and the "resin composed of a conventional silsesquioxane" obtained in Comparative Example 2 were each dissolved in toluene to a solids concentration of 20 wt %, and this toluene solution was used to spin coat a silicon wafer.

The coating on this wafer was then heated for 1 hour at 100° C. in a nitrogen atmosphere, and then heated for another 2 hours at 200° C. It was then heated for 40 minutes in an argon atmosphere while the temperature was raised at a rate of 5° C. per minute. After this, the coating film was finally heated for I hour at 400° C., which gave a film with a thickness of approximately 500 nm. Table 2 shows the results of measuring the dielectric constants of these coating films at various frequencies.

TABLE 2

Coating films composed of various types of material, and their dielectric constants

| | Coating material | | |
|---|---|---|---|
| Dielectric constant (frequency) | Present invention copolymer obtained in Working Example 1 | Present invention copolymer obtained in Working Example 10 | Resin composed of conventional hydrogenated silsesquioxane obtained in Comparative Example 2 |
| 0.1 kHz | 2.70 | 2.77 | 3.45 |
| 1.0 kHz | 2.70 | 2.77 | 3.45 |
| 10.0 kHz | 2.70 | 2.77 | 3.44 |
| 100 kHz | 2.68 | 2.76 | 3.43 |
| 1.0 MHz | 2.66 | 2.75 | 3.40 |
| 10.0 MHz | 2.61 | 2.75 | 3.37 |

Apparatus used to measure dielectric constant: Hewlett-Packard 4194A Impedance Analyzer.

The dielectric constant at a particularly high frequency is negatively correlated to electrical insulation. Specifically, a low dielectric constant is an index indicating excellent electrical insulation. Table 2 above shows that the copolymers obtained with the manufacturing method of the present invention have a lower dielectric constant and better electrical insulation properties than the copolymer of the comparative example, particularly at high frequency.

Also, a copolymer obtained with the method of the present invention will have adequate storage stability if stored so that it does not come into contact with water. After the copolymer has been applied by coating, dipping, or another such means, it absorbs the moisture in the air (and is heated if needed), which promotes crosslinking and curing, resulting in a layer and coating film having the necessary mechanical and electrical insulating characteristics.

As discussed above, a copolymer obtained with the manufacturing method of the present invention will have excellent properties as an insulation material.

What is claimed is:

1. A method for manufacturing an organic solvent-soluble hydrogenated octasilsesquioxane-vinyl group-containing copolymer comprising reacting 1 mol of (A) a hydrogenated octasilsesquioxane described by formula 1

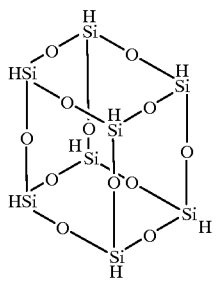

Formula 1 with 0.2 to less than 3 mol of (B) a divinyl group-containing compound described by formula (2)

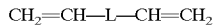

CH$_2$=CH—L—CH=CH$_2$   Formula 2 where L is selected from the group consisting of
(a) a divalent hydrocarbon group comprising 3 to 10 carbon atoms and
(b) —(SiR$_2$O)$_m$—SiR$_2$—, where each R is independently selected from the group consisting of alkyls comprising I to 6 carbon atoms and aryls comprising 6 to 9 carbon atoms and $1 \leq m \leq 10$; in the presence of a hydrosilylation catalyst.

2. A method according to claim 1, where R is an aryl group and m is a number from 2 to 10.

3. A method according to claim 1, where the divinyl group-containing compound is selected from the group described by formulas ViMe$_2$SiOSiMe$_2$Vi, ViPh$_2$SiOSiPh$_2$Vi, Vi(Me$_2$SiO)$_5$SiMe$_2$Vi, Vi(Me$_2$SiO)$_6$SiMe$_2$Vi, and ViC$_6$H$_4$Vi, where Vi is vinyl, Ph is phenyl, and Me is methyl.

4. A method according to claim 1, where the hydrosilylation catalyst is selected from the group consisting of platinum chloride, chloroplatinic acid, a platinum-olefin complex, a platinum-phosphine complex, a platinum-vinylsiloxane complex, and solutions thereof.

5. A method according to claim 1 comprising 0.25 to less than 2 mol of the divinyl group-containing compound.

6. An organic solvent-soluble hydrogenated octasilsesquioxane-vinyl group-containing copolymer prepared by the method comprising reacting 1 mol of (A) a hydrogenated octasilsesquioxane described by formula 1

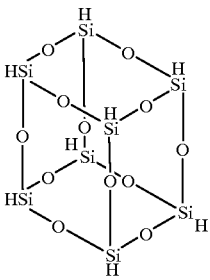

Formula 1 with 0.2 to less than 3 mol of (B) a divinyl group-containing compound described by formula (2)

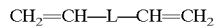

CH$_2$=CH—L—CH=CH$_2$   Formula 2 where L is selected from the group consisting of
(a) a divalent hydrocarbon group comprising 3 to 10 carbon atoms and
(b) —SiR$_2$O)$_m$—SiR$_2$—, where each R is independently selected from the group consisting of alkyls comprising 1 to 6 carbon atoms and aryls comprising 6 to 9 carbon atoms and $1 \leq m \leq 10$; in the presence of a hydrosilylation catalyst.

7. A copolymer according to claim 6, where R is an aryl group and m is a number from 2 to 10.

8. A copolymer according to claim 6, where the divinyl group-containing compound is selected from the group described by formula ViMe$_2$SiOSiMe$_2$Vi, ViPh$_2$SiOSiPh$_2$Vi, Vi(Me$_2$SiO)$_5$SiMe$_2$Vi, Vi(Me$_2$SiO)$_6$SiMe$_2$Vi, and ViC$_6$H$_4$Vi, where Vi is vinyl, Ph is phenyl, and Me is methyl.

9. A copolymer according to claim 6, where the hydrosilylation catalyst is selected from the group consisting of platinum chloride, chloroplatinic acid, a platinum-olefin complex, a platinum-phosphine complex, platinum-vinylsiloxane complex, and solutions thereof.

10. A copolymer according to claim 6 comprising 0.25 to less than 2 mol of the divinyl group-containing compound.

11. An electrical insulating film formed from the copolymer of claim 6.

* * * * *